United States Patent
Gross, Jr. et al.

(10) Patent No.: US 7,793,688 B1
(45) Date of Patent: Sep. 14, 2010

(54) RECREATIONAL VEHICLE WINTERIZER FITTING

(76) Inventors: Elmer C. Gross, Jr., 703 N. Rd., Niles, OH (US) 44446; Eugene B. Newcomb, 2378 Oakdale NW., Warren, OH (US) 44485

( * ) Notice: Subject to any disclaimer, the term of this patent is extended or adjusted under 35 U.S.C. 154(b) by 304 days.

(21) Appl. No.: 12/027,157

(22) Filed: Feb. 6, 2008

(51) Int. Cl.
   *F16K 11/22* (2006.01)
(52) U.S. Cl. .................. 137/893; 137/605; 137/899; 251/253
(58) Field of Classification Search ............. 137/602, 137/605, 606, 888, 892, 893, 899; 251/253; 261/66, 69.1
See application file for complete search history.

(56) References Cited

U.S. PATENT DOCUMENTS

| | | | |
|---|---|---|---|
| 2,768,844 A | 10/1956 | Schadeberg | |
| 3,445,067 A * | 5/1969 | Sheldall | 239/318 |
| 3,502,355 A | 3/1970 | Demler et al. | |
| 4,116,477 A | 9/1978 | Wahoski | |
| 4,266,813 A | 5/1981 | Oliver | |
| 5,488,968 A * | 2/1996 | Price et al. | 137/1 |
| 5,538,031 A | 7/1996 | Brence et al. | |
| 377,969 A | 2/1997 | GRANTHAM | |
| D377,969 S | 2/1997 | Grantham | |
| 5,775,592 A * | 7/1998 | Goldsmith et al. | 239/310 |
| 5,918,624 A * | 7/1999 | Young | 137/315.06 |
| 6,237,620 B1 * | 5/2001 | Ferguson | 137/209 |
| 6,267,303 B1 * | 7/2001 | Francis | 239/318 |
| 6,453,926 B1 * | 9/2002 | Baker | 137/3 |
| 471,262 A1 | 3/2003 | KOZU | |
| D471,262 S | 3/2003 | Kozu | |
| 6,708,717 B1 * | 3/2004 | Coogle | 137/240 |

OTHER PUBLICATIONS

Camco Blow-out plug http://www.campingworld.com/browse/skus/index.cfm?skunum=4410&src=SRQB.

* cited by examiner

*Primary Examiner*—John Rivell
*Assistant Examiner*—Jeremy S Baskin

(57) ABSTRACT

Disclosed is a system to winterize a recreational vehicle having plumbing lines. A hose may be attached to an air compressor and a recreational vehicle winterizer fitting may be attached between the hose and a freshwater inlet connection port of the recreational vehicle. The winterizer fitting may include a nib, a landing, a first transition, a second transition, and a body having a male connector and a fifth chamber. A pressure gage, a butterfly valve, and an antifreeze additive system may be attached to the body of the winterizer fitting.

14 Claims, 4 Drawing Sheets

RECREATIONAL VEHICLE WINTERIZER FITTING

BACKGROUND

1. Field

The information disclosed relates to a fitting configured to assist in removing water from plumbing lines of a recreational vehicle.

2. Background Information

Recreational vehicles are equipment that dually are used as both a vehicle and either a temporary travel home and a full time home. Recreational vehicles (RV) are intended for everything from brief leisure activities such as vacations and camping, to full time living, for which they are often parked in special trailer parks. They typically contain beds, a table, kitchens, storage areas, bathrooms, refrigerators, and showers. The water needs of the kitchen, bathroom, and showers are serviced by plumbing lines.

In the winter, plumbing lines of recreational vehicles are susceptible to breaking if water is left inside the lines to freeze and expand. There typically are two techniques to choose from to prevent recreational vehicle pipes from bursting during extremely cold temperatures. The first technique includes filling the plumbing system using nontoxic antifreeze. The second technique requires that compressed air be blown into the plumbing lines to purge the water.

Using compressed air to blow RV plumbing lines requires at least two people. After all the drains are open and the onboard water pump is run until the faucets run dry, all the drains are closed except for the hot-water tank drain and a faucet farthest from the water pump, which are left open. As one person holds a compressed air hose to the RV freshwater inlet connection port, the other person moves about the RV to closes one faucet and opens another faucet for each line in which air comes out. This process is repeated throughout the RV until all the plumbing lines have been blown clean. The system finally is winterized once all the drains and faucets are closed and the water pump is turned off.

It is often difficult to find a second person interested in helping out winterizing a recreational vehicle. Often, the RV owner spends considerable time looking for additional help. Thus, there is a need to reduce the number of people needed to winterize a recreational vehicle.

SUMMARY

Disclosed is a system to winterize a recreational vehicle having plumbing lines. A hose may be attached to an air compressor and a recreational vehicle winterizer fitting may be attached between the hose and a freshwater inlet connection port of the recreational vehicle. The winterizer fitting may include a nib, a landing, a first transition, a second transition, and a body having a male connector and a fifth chamber. A pressure gage, a butterfly valve, and an antifreeze additive system may be attached to the body of the winterizer fitting.

DETAILED DESCRIPTION

Figure 1:
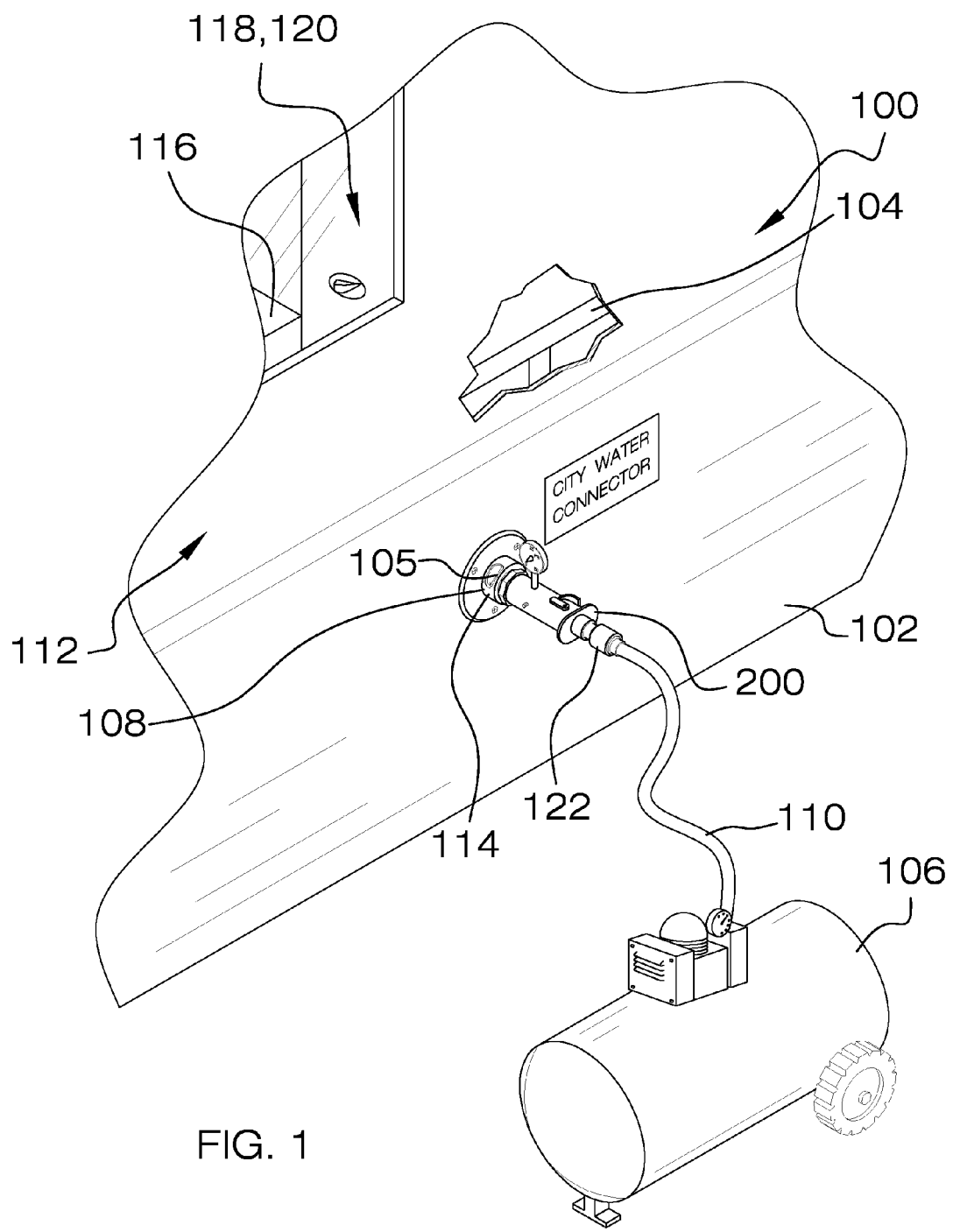
FIG. 1 is an isometric view of a system 100 to winterize a recreational vehicle 102 having plumbing lines 104 that may provide water to a kitchen faucet, a bathroom toilet, and a shower in recreational vehicle 102.

FIG. 1 is an isometric view of a system 100 to winterize a recreational vehicle 102 having plumbing lines 104 that may provide water to a kitchen faucet, a bathroom toilet, and a shower in recreational vehicle 102. In addition to recreational vehicle (RV) 102, system 100 may include an air compressor 106 and a recreational vehicle winterizer fitting 200. Recreational vehicle winterizer fitting 200 may be attached between a recreational vehicle freshwater inlet connection port 108 and a hose 110. With recreational vehicle winterizer fitting 200 held in place by recreational vehicle freshwater inlet connection port 108 and hose 110, a user may monitor and control pressure inside plumbing lines 104, move about recreational vehicle 102 to close one faucet and open another faucet for each plumbing line 104 in which air comes out, and add nontoxic antifreeze into plumbing lines 104.

Recreational vehicle 102 may be an enclosed piece of equipment, such as a camper or motor home, equipped with living facilities and dually used as both a vehicle for traveling and a temporary travel home for recreational activities. Plumbing lines 104 may be a system of pipes arranged in recreational vehicle walls 112 to convey water and other fluid throughout recreational vehicle 102. Plumbing lines 104 may have a plumbing line interior diameter 105 as measured within plumbing lines 104 at recreational vehicle freshwater inlet connection port 108. Recreational vehicle freshwater inlet connection port 108 may be an opening in an exterior side of recreational vehicle walls 112 having a port female connector 114. Port female connector 114 may be a part having internal threads that may mate with male threads of a mating part.

Recreational vehicle 102 may include a kitchen faucet 116, a bathroom toilet 118, and a shower 120, each connected to plumbing lines 104 to receive water through plumbing lines 104. Kitchen faucet 116 may be a regulator to dispense water into a sink within a kitchen equipped for cooking in recreation vehicle 102. Bathroom toilet 118 may be a device within recreation vehicle 102 that may use water to flush human waste. Shower 120 may be a room within recreation vehicle 102 to dispenses a water spray over a person. Typically, bathroom toilet 118 and shower 120 are combined into a single room in a recreational vehicle.

Air compressor 106 may be a machine that takes in air at atmospheric pressure and delivers it at a higher pressure by reducing its volume. Hose 110 may be a flexible pipe to convey fluid. Hose 110 may be connected to air compressor 106 at a first end and include a hose female socket 122 attached to a second end. Hose female socket 122 may be receptacle to aid in forming an air tight connection with hose 110.

Figure 2:
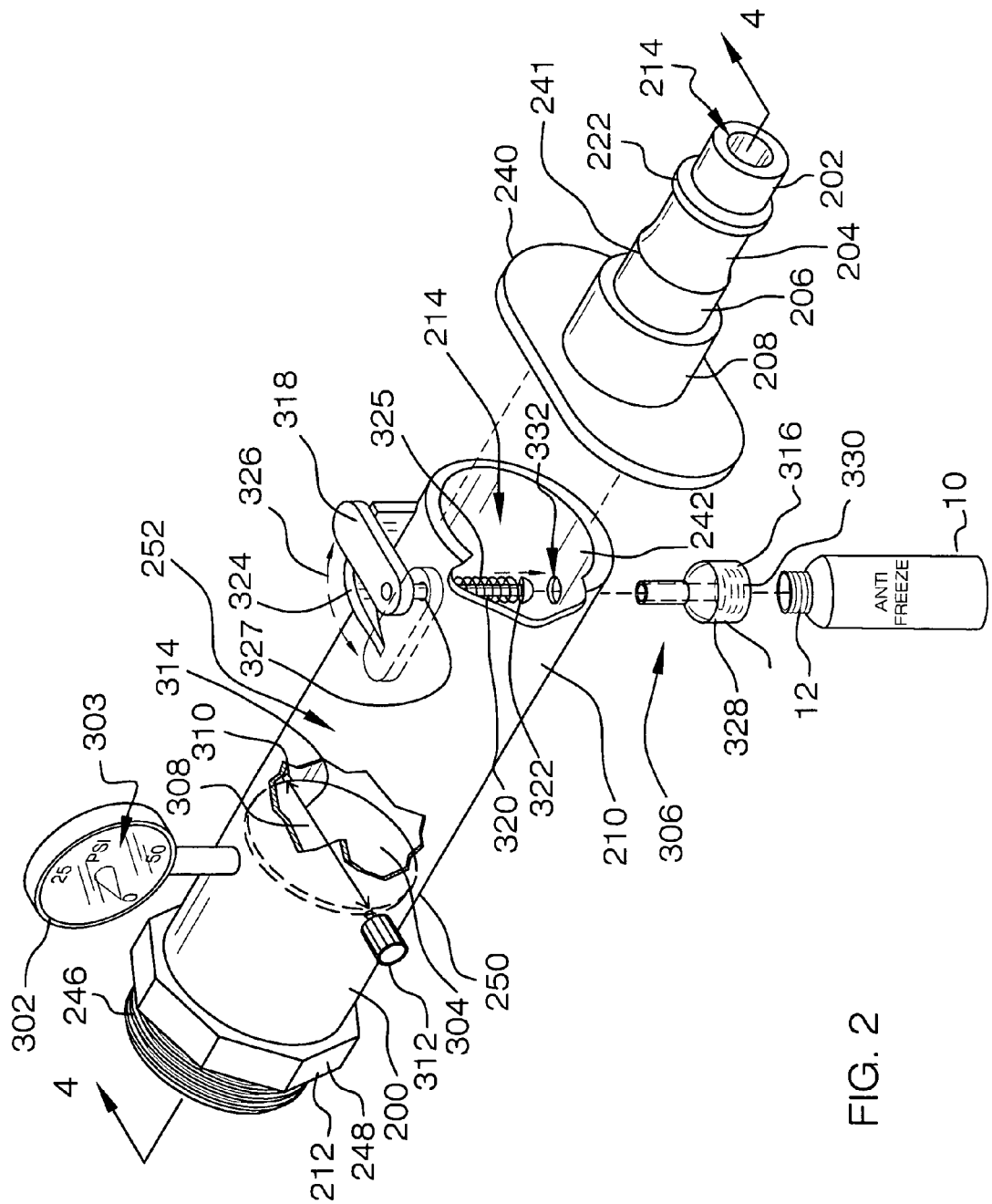
FIG. 2 is a front isometric view of recreational vehicle winterizing fitting 200.
Figure 3:
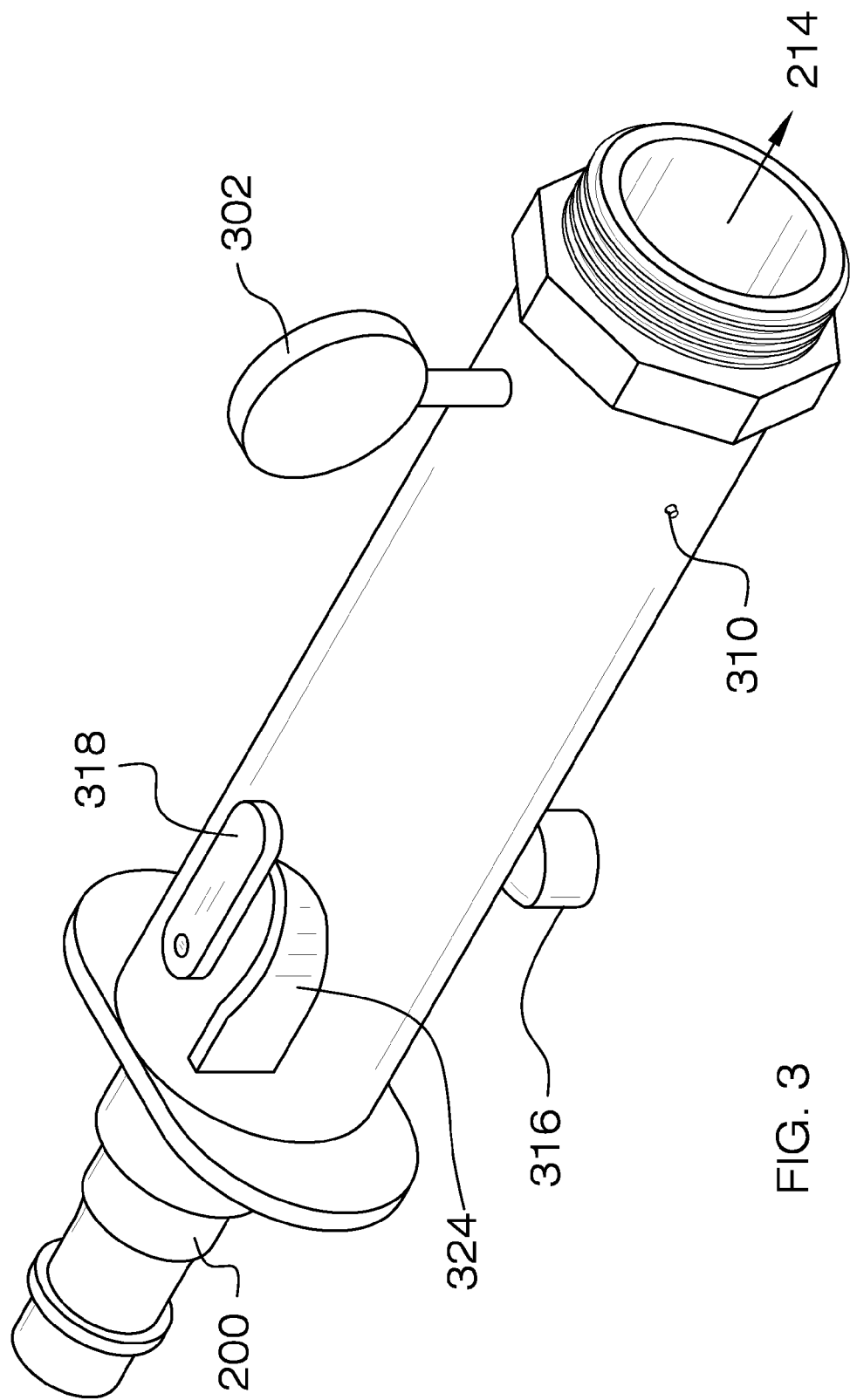
FIG. 3 is a rear isometric view of recreational vehicle winterizing fitting 200.
Figure 4:
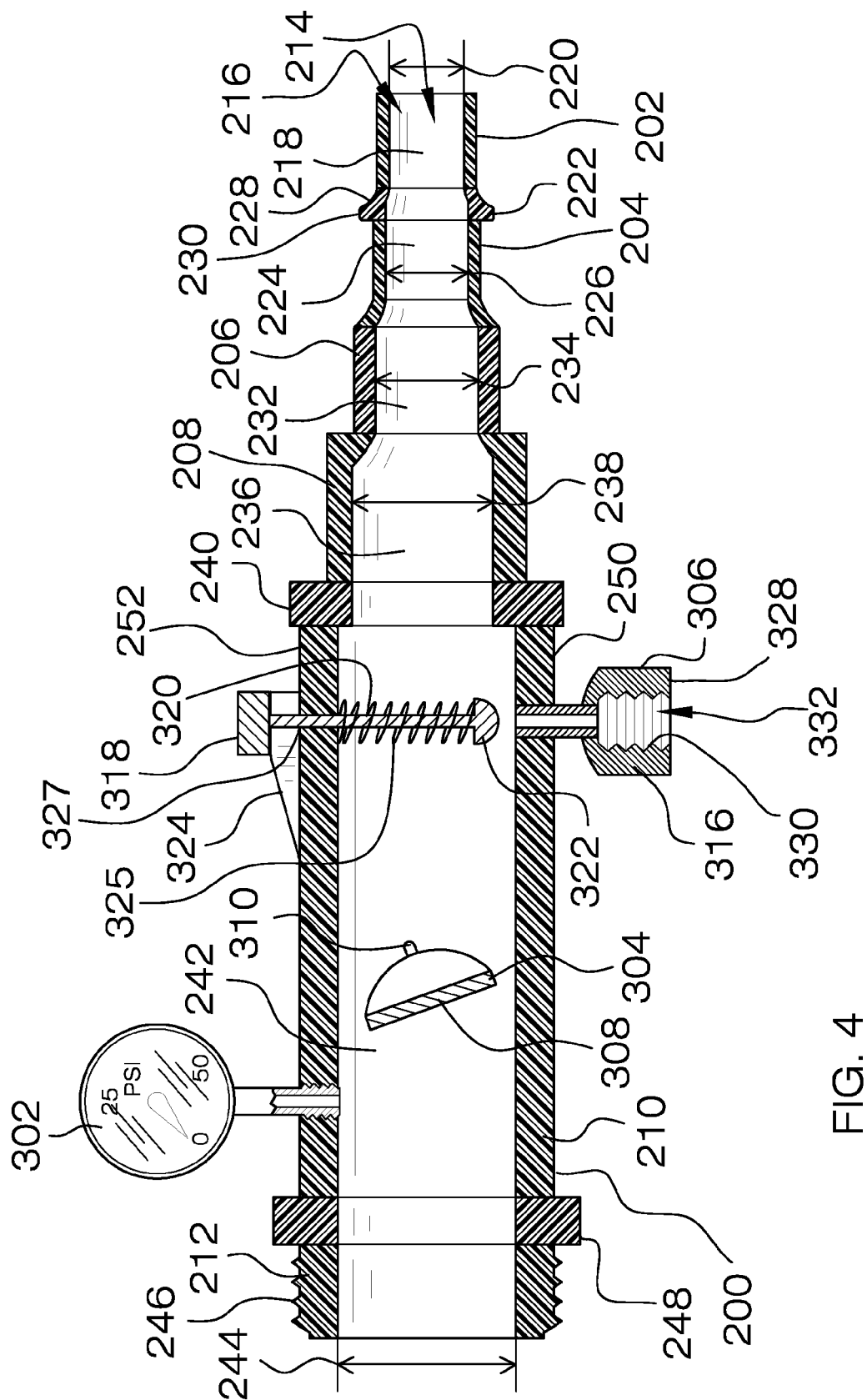
FIG. 4 is a section view of recreational vehicle winterizing fitting 200 generally taken off line 4-4 of FIG. 1.

FIG. 2 is a front isometric view of recreational vehicle winterizing fitting 200. FIG. 3 is a rear isometric view of recreational vehicle winterizing fitting 200. FIG. 4 is a section view of recreational vehicle winterizing fitting 200 generally taken off line 4-4 of FIG. 1. Recreational vehicle winterize fitting 200 may be a detachable part to help prepare recreational vehicle 102 for cold weather by removing water from and adding antifreeze to plumbing lines 104 of recreational vehicle 102. Recreational vehicle winterizing fitting 200 may include a nib 202, a landing 204, a first transition 206, a second transition 208, and a body 210 having a male connector 212. Nib 202, landing 204, first transition 206, second transition 208, and body 210 may be connected in series in that order to define a fitting passageway 214. Fitting passageway 214 may be an opening through recreational vehicle winterizing fitting 200 through which air may pass into recreational vehicle winterizing fitting 200, from nib 202 to male connector 212, and out of recreational vehicle winterizing fitting 200.

Nib 202 may be a hollow cylindrical shape having a nib opening 216 (FIG. 4) leading to a first chamber 218. First chamber 218 may be an empty space through which air may pass. First chamber 218 may have a first chamber diameter 220. Nib 202 may be positioned at one end of recreational vehicle winterizing fitting 200.

Landing 204 may be a hollow cylindrical shape having a landing lip 222 and enclosing a second chamber 224. Second chamber 224 may have a second chamber diameter 226 and may be an empty space through which air may pass. Landing lip 222 may be an annulus ring extending outward from landing 204. Landing lip 222 may have a landing lip fillet radius 228 that may transition upward from nib 202 to a landing lip exterior surface 230.

First transition 206 may be a hollow cylindrical shape enclosing a third chamber 232. Third chamber 232 may be an empty space through which air may pass. Third chamber 232 may have a third chamber diameter 234.

Second transition 208 may be a hollow cylindrical shape enclosing a fourth chamber 236. Fourth chamber 236 may be an empty space through which air may pass. Fourth chamber 236 may have a fourth chamber diameter 238. Second transition 208 may include tabs 240. Tabs 240 may be an oval protrusion extending outward from second transition 208 to a distance that may be handled by human fingers. Nib 202, landing 204, first transition 206, second transition 208, landing lip 222, and tabs 240 may be part of a compressor coupler 241 (FIG. 2). Compressor coupler 241 may be configured to connect with an air compressor, including to an air line connector of the air compressor. Body 210 may be adhered to tabs 240 by an adhesive or sonic welding. In an example, body 210, tabs 240, and second transition 208 may be produced as a single piece construction from an injection molding plastic process.

Body 210 may be a hollow cylindrical shape enclosing a fifth chamber 242. Fifth chamber 242 may be an empty space through which air and antifreeze may pass. Fifth chamber 242 may have a fifth chamber diameter 244. A gradual increase in interior diameter from first chamber 218 to fifth camber 242 may aid in controlling the pressure of air from air compressor 106 and provide a more accurate representation of pressure inside plumbing lines 104 as measured in fifth chamber diameter 244. Thus, in one example, fifth chamber diameter 244 substantially may be equal to plumbing line interior diameter 105 of plumbing lines 104 as measured at recreational vehicle freshwater inlet connection port 108. In another example, fifth chamber diameter 244 may be greater than fourth chamber diameter 238. Fourth chamber diameter 238 may be greater than third chamber diameter 234. Third chamber diameter 234 may be greater than second chamber diameter 226. Moreover, second chamber diameter 226 may be greater than first chamber diameter 220.

Male connector 212 may be a part having external/male threads 246 that may mate with the female/internal threads of port female connector 114 (FIG. 1). Male connector 212 additionally may include a hexagon ring 248. Hexagon ring 248 may be an eight sided structure extending radially outward from body 210.

Recreational vehicle winterizing fitting 200 additionally may include a pressure gage 302, a butterfly valve 304, and an additive system 306. Pressure gage 302 and butterfly valve 304 may allow a user may monitor and control pressure inside plumbing lines 104. Additive system 306 may allow a user to add antifreeze into plumbing lines 104.

Pressure gage 302 may be a gage having an analog dial 303 indicating the pounds per square inch (psi) of pressure. Pressure gage 302 may be inserted through body 210 and into fifth chamber 242 at a position that may be adjacent to hexagon ring 248. Pressure gage 302 may be configured to measure the pressure within fifth chamber 242 close to recreational vehicle freshwater inlet connection port 108. With pressure gage 302 positioned close to recreational vehicle freshwater inlet connection port 108 and fifth chamber 242 approximately the same interior diameter as plumbing line interior diameter 105, pressure measured within fifth chamber 242 may be representative of pressure inside plumbing lines 104.

Butterfly valve 304 may be a device to control the pressure and flow of air and antifreeze from fitting passageway 214 into plumbing lines 104. Butterfly valve 304 may include a plate 308, a valve rod 310, and a knob 312. Plate 308 may be attached to valve rod 310 within fifth chamber 242. Valve rod 310 may pass through body 210 and extend outward to be attached to knob 312.

Plate 308 may be a flat circular disc having a plate diameter 314. Plate diameter 314 may measure 85% to 95% of fifth chamber diameter 244. Plate 308 may be centered within fifth chamber 242 by valve rod 310. In one example, fifth chamber 242 may include a seat against which plate 308 may be sealed.

Valve rod 310 may be a shaft rotatably attached to body 210 at two locations to serve as a pivot axes for plate 308. Valve rod 310 may be position at a right angle to the flow direction within fitting passageway 214 and at a right angle to gage 302. Valve rod 310 may be positioned adjacent to and upstream of pressure gage 302.

Knob 312 may be a round handle configured to be rotated by a person's fingers. Knob 312 may be attached to valve rod 310 outside of body 210 at a right angle to analog dial 303 of pressure gage 302. Knob 312 may be an actuator for plate 308.

In operation, rotating knob 312 may turn plate 308 either parallel or perpendicular to the flow within fifth chamber 242. When butterfly valve 304 is closed, knob 312 is turned to rotate plate 308 so that plate 308 completely blocks off fitting passageway 214. When butterfly valve 304 is fully open, plate 308 is rotated at least a quarter turn to allow unrestricted passage of air and antifreeze. Knob 312 may be rotated incrementally to regulate flow.

As noted above, additive system 306 may allow a user to add antifreeze into plumbing lines 104. Antifreeze may include a substance that has a freezing point of approximately −40° C. as compared to the 0° C. freezing point of water. Since plumbing lines 104 carry water to be consumed, the antifreeze should be nontoxic.

Additive system 306 may include a bottle fitting 316, a handle 318, a stem 320, a plug 322, a ramp 324, and a spring 325. Bottle fitting 316 may be attached to a body bottom 250 of body 210 and handle 318 may be attached to a body top 252 of body 210 above bottle fitting 316. Ramp 324 may reside vertically between body 210 and a path of rotation 326 (FIG. 2) of handle 318. Stem 320 may be connected to handle 318 and pass into fifth chamber 242 through a fifth chamber hole 327. A seal having spiral threads may be attached to stem 320 and located in fifth chamber hole 327, where fifth chamber hole 327 may have spiral threads that may mate with those of stem 320. Plug 322 may be attached to stem 320 within fifth chamber 242. Spring 325 may be attached around stem 320 and seated between plug 322 and an interior surface of fifth chamber 242 to spring-bias additive system 306.

The incline of ramp 324 in a side view (FIG. 4) may be straight. Ramp 324 also may curve in top view FIG. 3 so that ramp 324 may extend around fifth chamber hole 327 and stem 320. Ramp 324 may have a flat upper surface on which handle 318 may reside. When handle 318 is aligned parallel to the flow direction of fitting passageway 214, handle 318 may rest on top of body 318 (FIG. 3) and ramp 324 may be off to a side of handle 318. When handle 318 is aligned perpendicular to the flow direction of fitting passageway 214 (FIG. 4), handle 318 may rest on top of ramp 324 and ramp 324 may be below handle 318.

Bottle fitting 316 may include a cap 328 having internal threads 330 configured to fit about external threads 12 of an antifreeze bottle 10. Additive system 306 may include an additive passageway 332 (FIG. 4) and extend through body 210 to connect additive passageway 332 with fitting passageway 214 in fifth chamber 242. Bottle fitting 316 may be attached to body bottom 250 between tabs 240 and knob 312.

Handle 318 may be a lever configured to be rotated by a person's hand. Stem 320 may be a rod attached to handle 318 and extended into fifth chamber 242 at a position directly above additive passageway 332. Plug 322 may be a round or tapered device configured to seal additive passageway 332 when pressed against additive passageway 332. Plug 322 may be attached to an end of stem 320. Ramp 324 may have both a curved path and a straight inclined path along which handle 318 may travel. Ramp 324 may be flush with body 210 near body top 252 and rise above body 210 in an inclined path. Additive system 306 may by spring biased closed. For example, a spring may be secured in compression about stem 320 between plug 322 and body 210 to spring bias additive system 306 closed.

When handle 318 is aligned parallel to the flow direction of fitting passageway 214, plug 322 may be inserted into additive passageway 332 to seal additive passageway 332 from fitting passageway 214. When handle 318 is aligned at a right angle to the flow direction of fitting passageway 214, plug 322 may be remote from additive passageway 332 to create a connection between fitting passageway 214 and additive passageway 332. Fifth chamber 242 may include a constricted area before additive passageway 323 to crate a vacuum over additive passageway 323 by increasing air velocity within fifth chamber 242. When plug 322 no longer seals additive passageway 332, this vacuum may draw antifreeze out of bottle 10 and into the fluid stream, where it may be carried from recreational vehicle winterizer fitting 200 into plumbing lines 104.

The winterizer fitting may be a plastic hose fitting to remove water from the lines of a recreational vehicle for winterizing. Removing water from the plumbing lines may prevent water inside the lines from freezing, expanding, and bursting, which may cause significant damage inside the recreational vehicle. The winterizer fitting may enable one person to perform the water removal task in a simple and efficient manner.

The winterizer fitting may be a cylindrical plastic device that may measure approximately three inches long and one inch in diameter. One end of the winterizer fitting may have external male water hose threads to screw onto the connector at the outside of the recreational vehicle. The opposite end may have a ¼-inch diameter coupler to connect to a pressurized air line.

When preparing a recreational vehicle to be winterized, the winterizer fitting may be screwed into a freshwater inlet connection at the outside of the recreational vehicle. The air line connector for a small compressor may then be attached to the exposed coupler at the outer end. With the compressor on, compressed air may be forced into the plumbing lines through the winterizer fitting to remove any water remaining in the lines, thus preventing the lines from freezing in the winter. This may eliminate the typical requirement of two people to evacuate the water lines for recreational vehicle winterizing.

The winterizer fitting may be used with motor homes, fifth-wheel travel trailers, conventional travel trailers, and other recreational vehicles with freshwater inlets. It may be used by campgrounds, landscaping contractors, camps, trailer parks, and other facilities with seasonal housing. The winterizer fitting may fulfill a need for removing water from the lines of a recreational vehicle for winterizing. The appealing features of the winterizer fitting may be its ease of use, convenience, and the protection provided. Instead of two people being required to winterize a recreational vehicle, one person may perform the operation using the winterizer fitting. The winterizer fitting may simplify the operation and allow pressurized air to completely remove any remaining water and may prevent freezing, expansion, and breaking of the lines in winter, as well as subsequent expensive water damage to the interior. The winterizer fitting may provide peace of mind for concerned recreational vehicle owners and simplify maintenance. In addition, the winterizer fitting may be lightweight, corrosion resistant, reliable, and effective.

The information disclosed herein is provided merely to illustrate principles and should not be construed as limiting the scope of the subject matter of the terms of the claims. The written specification and figures are, accordingly, to be regarded in an illustrative rather than a restrictive sense. Moreover, the principles disclosed may be applied to achieve the advantages described herein and to achieve other advantages or to satisfy other objectives, as well.

What is claimed is:

1. In a system to winterize a recreational vehicle having plumbing lines, a recreational vehicle winterizer fitting comprising:
   a compressor coupler having in sequential order a nib defining a first chamber diameter, a landing lip extending radially out from the nib and then a landing defining a second chamber diameter, and a first transition defining a third chamber diameter, where the third chamber diameter is greater than the second chamber diameter, and where the second chamber diameter is greater than the first chamber diameter;
   a single piece construction having tabs having a fourth chamber diameter connected between a second transition having the fourth chamber diameter and a body having a male connector and a fifth chamber defining a fifth chamber diameter, where the fourth chamber diameter is greater than the third chamber diameter and the fifth chamber diameter is not greater than one inch and is greater than the fourth chamber diameter, where the first transition and the second transition are connected to define a fitting passageway through the recreational vehicle winterizer fitting characterized by each of the chamber diameters to receive a fluid flow in the nib, through the fitting passageway, and out the male connector;
   a bottle fitting attached through the body adjacent to the tabs to define an additive passageway having internal threads on one end and an additive passageway outlet that leads to the fifth chamber on the other end, whereby the additive passageway is orientated and configure to use the fluid flow to feed a continuous stream of additive from an additive bottle connected to the bottle fitting from a position at a bottom of the body;
a stem attached through the body, where a handle is attached to the stem outside of the body, where the stem includes a plug positioned inside the body directly over the additive passageway outlet, and where a spring is positioned in compression about the stem and against both the plug and an interior surface of the of the body to bias the plug down towards the additive passageway;
a pressure gage attached through the body at a position adjacent to the male connector to advantageously obtain a more accurate representation of pressure inside the plumbing lines, where the pressure gage includes a pressure gage dial; and
a butterfly valve having a valve rod connected through the body at a position between the stem and the pressure gage, where the valve rod is attached to and through a plate positioned within the fifth chamber and attached to a pressure regulation knob positioned outside the body, where the pressure gage dial faces towards the pressure regulation knob.

2. The recreational vehicle winterizer fitting of claim 1, where the landing lip includes a landing lip fillet radius that transitions upward from the nib to a landing lip exterior surface, and where the tabs are an oval shape extending outward from the second transition.

3. The recreational vehicle winterizer fitting of claim 2, further comprising:
a bottle containing additive, where the bottle is attached to the bottle fitting; and
a ramp residing vertically between the body and a path of rotation of the handle, where the incline of ramp in a side view is straight and the ramp also curves in a top view so that the ramp extends around the stem, and where the ramp has a flat upper surface on which handle is configured to reside.

4. The recreational vehicle winterizer fitting of claim 1, where the additive passageway is orientated perpendicular to the fitting passageway.

5. The recreational vehicle winterizer fitting of claim 1, where diameter of the plate measures 85% to 95% of the fifth chamber diameter and where the fifth chamber includes a seat against which the plate is configured to sealed.

6. The recreational vehicle winterizer fitting of claim 5, where the valve rod is orientated perpendicular to the pressure gage dial.

7. A system to winterize a recreational vehicle having plumbing lines, the system comprising:
a recreational vehicle having plumbing lines configured to provide water to at least one of a kitchen faucet, a bathroom toilet, and a shower in the recreational vehicle, where the recreational vehicle includes a recreational vehicle freshwater inlet connection port connected to the plumbing lines, where a port female connector with internal threads is connected to the recreational vehicle freshwater inlet connection port and where the plumbing lines have a plumbing line diameter as measured at the recreational vehicle freshwater inlet connection port;
an air compressor to take in air at atmospheric pressure and deliver the air at a higher pressure;
a hose attached to the air compressor at one end and having a hose female socket attach at an opposite end;
a recreational vehicle winterizer fitting attached between the hose female socket and the port female connector, where the recreational vehicle winterizer fitting includes a nib having a first chamber defining a first chamber diameter, a landing having a second chamber defining a second chamber diameter, a first transition having a third chamber defining a third chamber diameter, a second transition having a fourth chamber defining a fourth chamber diameter, and a body having a fifth chamber defining a fifth chamber diameter, where the nib, the landing, the first transition, the second transition, and the body are connected in series in that order to define a fitting passageway, where the second transition includes tabs, where the fifth chamber diameter substantially equals the plumbing line interior diameter as measured at the recreational vehicle freshwater inlet connection port, where the body includes a male connector attached to the port female connector, where the recreational vehicle winterizer fitting further includes a pressure gage extending through the body into the fifth chamber, a butterfly valve having a plate rotatably fixed within the fifth chamber by a valve rod that extends outside of the body to attach to a knob, and an additive system,
where the additive system includes a bottle fitting attached to a body bottom of the body to create an additive passageway, a handle attached to a body top of the body by a stem, where a plug is attached to the stem within the fifth chamber, where the stem is connected to the handle to position the plug directly above the additive passageway, where the bottle fitting includes a cap having internal threads configured to fit about external threads of an antifreeze bottle, and
where the pressure gage is attached to the body at a position that is adjacent to the male connector.

8. The system of claim 7, where the landing includes a landing lip having a landing lip fillet radius that transitions upward from the nib to a landing lip exterior surface, and where the tabs are an oval shape extending outward from the second transition.

9. The system of claim 7, where the fifth chamber diameter is greater than fourth chamber diameter, where the fourth chamber diameter is greater than third chamber diameter, where the third chamber diameter is greater than the second chamber diameter, and where the second chamber diameter is greater than the first chamber diameter.

10. The system of claim 7, where the valve rod is positioned adjacent to and upstream of the pressure gage and where the bottle fitting is attached to the body bottom between the tabs and the knob, the system further comprising:
a ramp residing vertically between the body and a path of rotation of the handle, where the incline of ramp in a side view is straight and the ramp also curves in a top view so that the ramp extends around the stem, and where the ramp has a flat upper surface on which handle is configured to reside.

11. A method to winterize a recreational vehicle having plumbing lines, the method comprising:
presenting a recreational vehicle winterizer fitting comprising: a compressor coupler having in sequential order a nib defining a first chamber diameter, a landing lip extending radially out from the nib and then a landing defining a second chamber diameter, and a first transition defining a third chamber diameter, where the third chamber diameter is greater than the second chamber diameter, and where the second chamber diameter is greater than the first chamber diameter, a single piece construction having tabs having a fourth chamber diameter connected between a second transition having the fourth chamber diameter and a body having a male connector and a fifth chamber defining a fifth chamber diameter, where the fourth chamber diameter is greater than the third chamber diameter and the fifth chamber diameter is not greater than one inch and is greater than the fourth chamber diameter, where the first transition and the second transition are connected to define a fitting passageway through the recreational vehicle winterizer fitting characterized by each of the chamber diameters to receive a fluid flow in the nib, through the fitting passageway, and out the male connector, a bottle fitting attached through the body adjacent to the tabs to define an additive passageway having internal threads on one end and an additive passageway outlet that leads to the fifth chamber on the other end, whereby the additive passageway is orientated and configure to use the fluid flow to feed a continuous stream of additive from an additive bottle connected to the bottle fitting from a position at a bottom of the body, a stem attached through the body, where a handle is attached to the stem outside of the body, where the stem includes a plug positioned inside the body directly over the additive passageway outlet, and where a spring is positioned in compression about the stem and against both the plug and an interior surface of the of the body to bias the plug down towards the additive passageway, a pressure gage attached through the body at a position adjacent to the male connector to advantageously obtain a more accurate representation of pressure inside the plumbing lines, where the pressure gage includes a pressure gage dial, and a butterfly valve having a valve rod connected through the body at a position between the stem and the pressure gage, where the valve rod is attached to and through a plate positioned within the fifth chamber and attached to a pressure regulation knob positioned outside the body, where the pressure gage dial faces towards the pressure regulation knob;

attaching a hose to the compressor coupler; and attaching a compressor to the hose.

12. The method of claim 11, further comprising:

attaching the male connector directly to a water inlet of the recreational vehicle.

13. The method of claim 12, further comprising:

passing compressed air through the recreational vehicle winterizer, whereby the same person attaching the make connector and connecting the compressor coupler is free to move about the recreational vehicle to closes one faucet and open another faucet for each line in which air comes out, where a ramp resides vertically between the body and a path of rotation of the handle, where the incline of ramp in a side view is straight and the ramp also curves in a top view so that the ramp extends around the stem, and where the ramp has a flat upper surface on which handle is configured to reside.

14. The method of claim 11, where the first transition and the second transition are connected by one of applying adhesive and utilizing sonic welding.

* * * * *